United States Patent
Yamazaki et al.

(10) Patent No.: US 9,331,349 B2
(45) Date of Patent: May 3, 2016

(54) WASTE HEAT RECOVERY SYSTEM

(71) Applicant: HONDA MOTOR CO., LTD., Tokyo (JP)

(72) Inventors: Kazumi Yamazaki, Wako (JP); Kazutaka Nakai, Wako (JP); Shiro Yagawa, Wako (JP); Daiki Nagata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 161 days.

(21) Appl. No.: 14/288,303

(22) Filed: May 27, 2014

(65) Prior Publication Data
US 2014/0356748 A1 Dec. 4, 2014

(30) Foreign Application Priority Data

May 30, 2013 (JP) ................................. 2013-113915

(51) Int. Cl.
*H01M 8/04* (2006.01)
(52) U.S. Cl.
CPC ...... *H01M 8/04074* (2013.01); *H01M 8/04007* (2013.01); *H01M 8/04029* (2013.01); *H01M 8/0432* (2013.01); *H01M 8/04768* (2013.01); *H01M 2250/20* (2013.01); *Y02E 60/50* (2013.01)

(58) Field of Classification Search
CPC ..................... H01M 8/04074; H01M 8/04007; H01M 8/04029; H01M 8/0432; H01M 8/04768; H01M 2250/20; Y02E 60/50
See application file for complete search history.

(56) References Cited

FOREIGN PATENT DOCUMENTS

JP 2012-023795 2/2012

*Primary Examiner* — Brittany Raymond
(74) *Attorney, Agent, or Firm* — Mori & Ward, LLP (57) ABSTRACT

A waste heat recovery system includes a fuel cell, a coolant circulation flow passage, a first heat exchanger, a waste heat recovery flow passage, a second heat exchanger, an upstream end of the waste heat recovery flow passage, and a downstream end of the waste heat recovery flow passage. The coolant circulation flow passage includes a first coolant supply flow passage, a first coolant exhaust flow passage, and a first bypass flow passage. The upstream end is connected to at least one of an inlet coolant reservoir and the first coolant exhaust flow passage at a position downstream of a connection point between the first coolant exhaust flow passage and the first bypass flow passage. The downstream end is connected to at least one of the inlet coolant reservoir, an outlet coolant reservoir, and the first coolant supply flow passage.

9 Claims, 5 Drawing Sheets

WASTE HEAT RECOVERY SYSTEM

CROSS-REFERENCE TO RELATED APPLICATIONS

The present application claims priority under 35 U.S.C. §119 to Japanese Patent Application No. 2013-113915, filed May 30, 2013, entitled "Waste Heat Recovery System." The contents of this application are incorporated herein by reference in their entirety.

BACKGROUND

1. Field

The present disclosure relates to a waste heat recovery system.

2. Description of the Related Art

Fuel cells that generates electricity when fuel gas (hydrogen) is supplied to the anode thereof and oxidant gas (air containing oxygen) is supplied to the cathode also generate heat due to electrode reaction. Accordingly, a technology for using waste heat of the fuel cell as a heat source of, for example, vehicle interior heating has been developed.

For example, Japanese Unexamined Patent Application Publication No. 2012-23795 describes a cooling system including a cooling channel that allows coolant flowing out of a fuel cell to circulate therethrough and an air conditioning channel that branches from the cooling channel. The cooling channel includes a bypass flow passage that allows the coolant to pass therethrough when the coolant bypasses a radiator. In addition, the air conditioning channel is connected to a coolant exhaust flow passage that allows the coolant exhausted from the fuel cell to flow therethrough at a point upstream of a connection point between the coolant exhaust flow passage and the bypass flow passage.

SUMMARY

According to one aspect of the present invention, a waste heat recovery system includes a fuel cell, a coolant circulation flow passage, a first heat exchanger, a first coolant circulation unit, a first switching unit, a waste heat recovery flow passage, a second heat exchanger, and a second coolant circulation unit. The fuel cell includes a reaction gas flow passage and a coolant flow passage. The fuel cell generates electricity if reaction gas is supplied to the reaction gas flow passage. The coolant circulation flow passage is configured to allow a coolant flowing out of the coolant flow passage to return to the coolant flow passage and circulate through the coolant flow passage. The first heat exchanger is disposed in the coolant circulation flow passage. The first heat exchanger causes the coolant to dissipate heat through heat exchange with air. The first coolant circulation unit is disposed in the coolant circulation flow passage. The first coolant circulation unit causes the coolant to circulate. The first switching unit is disposed in the coolant circulation flow passage. The first switching unit switches a flow direction of the coolant so that the coolant flows through the first heat exchanger if a temperature of the fuel cell is higher than or equal to a predetermined value. The waste heat recovery flow passage is configured to branch the coolant circulating through the coolant circulation flow passage and recover waste heat of the fuel cell through heat exchange with air. The second heat exchanger is disposed in the waste heat recovery flow passage. The second heat exchanger exchanges heat between air-conditioning air and the coolant. The second coolant circulation unit is disposed in the waste heat recovery flow passage. The second coolant circulation unit circulates the coolant. The first heat exchanger includes an inlet coolant reservoir that reserves the coolant flowing out of the coolant flow passage, a heat dissipation unit configured to dissipate heat of the coolant flowing out of the inlet coolant reservoir through heat exchange with air, and an outlet coolant reservoir that reserves the coolant that has dissipated heat in the heat dissipation unit. The coolant circulation flow passage includes a first coolant supply flow passage that is connected to the outlet coolant reservoir and an inlet port of the coolant flow passage and that allows the coolant to be supplied to the coolant flow passage to pass therethrough, a first coolant exhaust flow passage that is connected to an outlet port of the coolant flow passage and the inlet coolant reservoir and that allows the coolant exhausted from the coolant flow passage to pass therethrough, and a first bypass flow passage that is connected to the first coolant supply flow passage and the first coolant exhaust flow passage so as to bypass the first heat exchanger. An upstream end of the waste heat recovery flow passage is connected to one of the first coolant exhaust flow passage at a position downstream of a connection point between the first coolant exhaust flow passage and the first bypass flow passage and the inlet coolant reservoir. A downstream end of the waste heat recovery flow passage is connected to one of the inlet coolant reservoir, the outlet coolant reservoir, and the first coolant supply flow passage.

According to another aspect of the present invention, a waste heat recovery system includes a fuel cell, a coolant circulation flow passage, a first heat exchanger, a first coolant circulator, a first switching device, a waste heat recovery flow passage, a second heat exchanger, a second coolant circulator, an upstream end of the waste heat recovery flow passage, and a downstream end of the waste heat recovery flow passage. The fuel cell includes a reaction gas flow passage and a coolant flow passage and is configured to generate electricity by supplying reaction gas to the reaction gas flow passage. The coolant circulation flow passage is connected to the coolant flow passage to circulate a coolant in the coolant flow passage and the coolant circulation flow passage. The first heat exchanger is disposed in the coolant circulation flow passage to cool the coolant by heat exchange with air. The first coolant circulator is disposed in the coolant circulation flow passage to circulate the coolant in the coolant flow passage and the coolant circulation flow passage. The first switching device is disposed in the coolant circulation flow passage and configured to switch a flow direction of the coolant so that the coolant flows through the first heat exchanger if a temperature of the fuel cell is higher than or equal to a predetermined temperature. The coolant is to flow through the waste heat recovery flow passage to recover heat of the fuel cell by heat exchange with air. The second heat exchanger is disposed in the waste heat recovery flow passage to exchange heat between air-conditioning air and the coolant. The second coolant circulator is disposed in the waste heat recovery flow passage to circulate the coolant. The first heat exchanger includes an inlet coolant reservoir to reserve the coolant from the coolant circulation flow passage, a heat dissipator connected to the inlet coolant reservoir to dissipate heat of the coolant from the inlet coolant reservoir by heat exchange with air, and an outlet coolant reservoir connected to the heat dissipator to reserve the coolant from the heat dissipator. The coolant circulation flow passage includes a first coolant supply flow passage connected to the outlet coolant reservoir and an inlet port of the coolant flow passage to supply the coolant to the coolant flow passage, a first coolant exhaust flow passage connected to an outlet port of the coolant flow passage and the inlet coolant reservoir to discharge the coolant from the coolant flow passage to the inlet coolant reservoir, and a first bypass flow passage connected to the first coolant supply flow passage and the first coolant exhaust flow passage to bypass the first heat exchanger. The upstream end of the waste heat recovery flow passage is connected to at least one of the inlet coolant reservoir and the first coolant exhaust flow passage at a position downstream of a connection point between the first coolant exhaust flow passage and the first bypass flow passage. The downstream end of the waste heat recovery flow passage is connected to at least one of the inlet coolant reservoir, the outlet coolant reservoir, and the first coolant supply flow passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

First Exemplary Embodiment

Configuration of Waste Heat Recovery System

Figure 1:
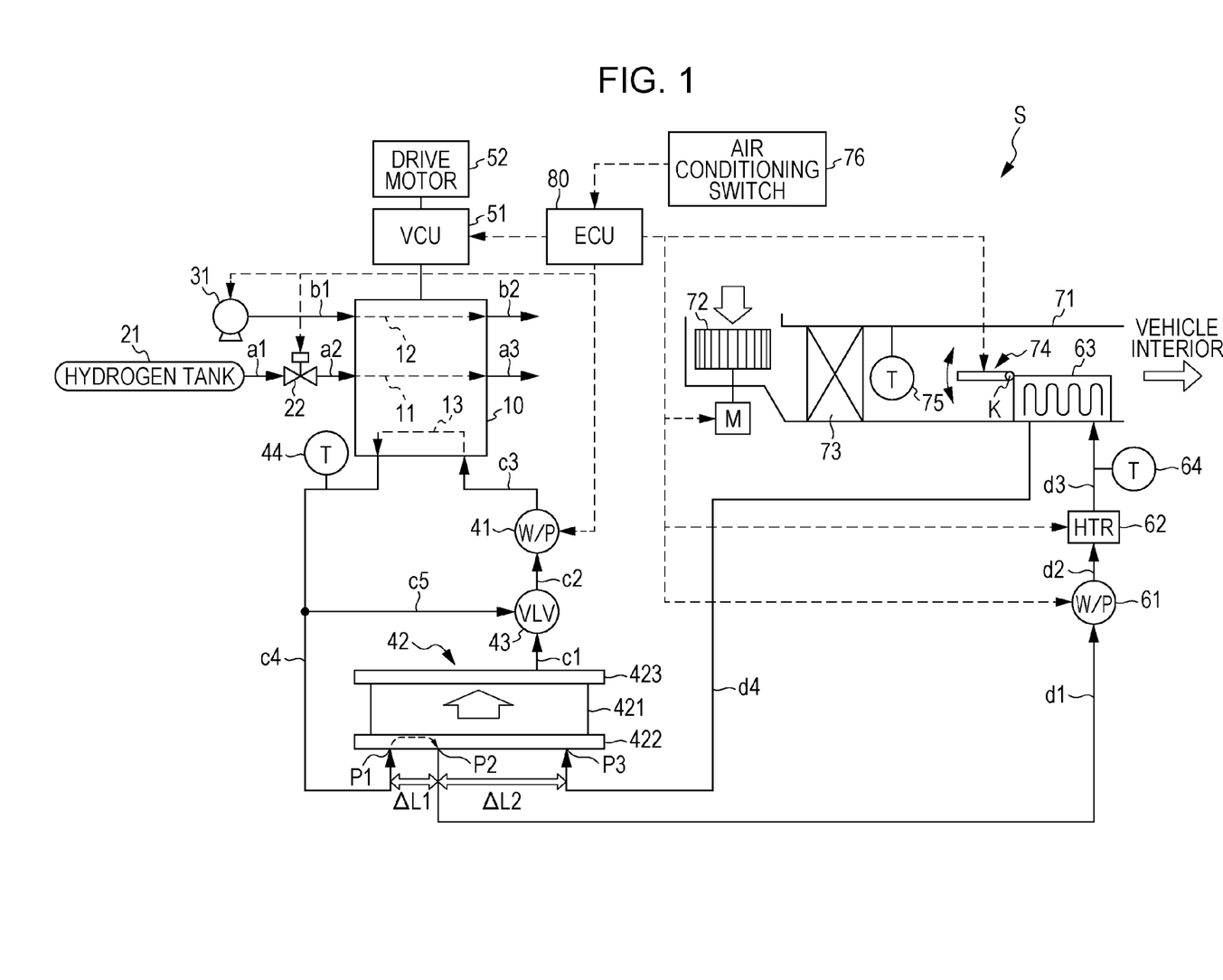
FIG. 1 is a block diagram illustrating the configuration of a waste heat recovery system according to a first exemplary embodiment of the present disclosure.

A waste heat recovery system S recovers waste heat (surplus heat) of a fuel cell 10 and uses the recovered heat as a heat source of vehicle interior heating. The waste heat recovery system S that is mounted in, for example, a fuel cell vehicle is described below.

As illustrated in FIG. 1, the waste heat recovery system S includes the fuel cell 10, an anode system that supplies anode gas (hydrogen gas) to the anode of the fuel cell 10, a cathode system that supplies cathode gas (air containing oxygen) to the cathode of the fuel cell 10, an FC (fuel cell) coolant system that circulates coolant throughout the fuel cell 10, an electricity consumption system that consumes electricity generated by the fuel cell 10, an air conditioning coolant system that circulates the coolant through a heater core 63, and an electric control unit (ECU) 80 that control such systems.

Fuel Cell

The fuel cell 10 is a polymer electrolyte fuel cell (PEFC). The fuel cell 10 is formed by stacking a plurality of cells (not illustrated). Each of the cells is formed by sandwiching a membrane electrode assembly (MEA) by a pair of conductive separators (not illustrated). Each of the separators of the fuel cell 10 has grooves and through-holes formed in the membrane electrode assembly. The grooves and thorough-holes are used for supplying hydrogen and oxygen to the entire surface of the membrane electrode assembly and function as an anode flow passage 11 and a cathode flow passage 12. Note that a "reaction gas flow passage" that receives reaction gas (hydrogen gas and air containing oxygen) is formed so as to include the anode flow passage 11 and the cathode flow passage 12. In addition, the separator has a coolant flow passage 13 formed therein. The coolant flow passage 13 allows coolant (e.g., water containing ethylene glycol) to pass therethrough in order to cool the fuel cell 10.

If hydrogen (reaction gas) is supplied through the anode flow passage 11 in the fuel cell 10, electrode reaction as described by the following equation (1) occurs:

$$2H_2 \rightarrow 4H^+ + 4e^- \quad (1).$$

In addition, if air containing oxygen (reaction gas) is supplied through the cathode flow passage 12, electrode reaction as described by the following equation (2) occurs:

$$O_2 + 4H^+ + 4e^- \rightarrow 2H_2O \quad (2).$$

Thus, a potential difference called an open circuit voltage (OCV) is generated in each of the cells.

Anode System

The anode system includes a hydrogen tank 21 and a shut-off valve 22. The hydrogen tank 21 is filled with compressed high purity hydrogen. The hydrogen tank 21 is connected to the shut-off valve 22 via a pipe a1. The shut-off valve 22 is open or closed under the control of the ECU 80 so that hydrogen in the hydrogen tank 21 is supplied to or blocked from the fuel cell 10. The shut-off valve 22 is connected to the anode flow passage 11 via a pipe a2.

In addition, a pressure reduction valve (not illustrated) that reduces the pressure of the hydrogen supplied through the shut-off valve 22 is provided in the pipe a2, and a diluter (not illustrated) that dilutes anode off-gas exhausted from the anode flow passage 11 is provided in a pipe a3.

Cathode System

The cathode system includes a compressor 31. The compressor 31 rotates an impeller (not illustrated) mounted therein under the control of the ECU 80. Thus, the compressor 31 introduces outside air therein and compresses the air. Thereafter, the compressor 31 supplies the compressed air to the cathode flow passage 12 via a pipe b1.

In addition, a humidifier (not illustrated) that exchanges humidity between low-humidity air supplied via the pipe b1 and high-humidity cathode off-gas exhausted via a pipe b2 is provided. Furthermore, a back pressure valve (not illustrated) that regulates the pressure of the air (the back pressure) flowing through the cathode flow passage 12 is provided in the pipe b2.

FC Coolant System

The FC coolant system includes a coolant pump 41, a radiator 42, a thermostat valve 43, and a temperature sensor 44. The coolant pump 41 (a first coolant circulation unit) operates under the control of the ECU 80 and pumps the coolant to the coolant flow passage 13. An intake portion of the coolant pump 41 is connected to the thermostat valve 43 via a pipe c2, and an exhaust portion of the coolant pump 41 is connected to an inlet port of the coolant flow passage 13 via a pipe c3.

The radiator 42 (a first heat exchanger) serves as a heat exchanger for dissipating the heat of high-temperature coolant flowing out of the coolant flow passage 13. The radiator 42 includes a heat dissipation unit 421 that dissipates the heat of the coolant flowing out of the coolant flow passage 13 by heat exchange with air, a lower tank 422 connected to the upstream end of the heat dissipation unit 421, and an upper tank 423 connected to the downstream end of the heat dissipation unit 421.

The heat dissipation unit 421 includes a plurality of tubes (not illustrated) through which the coolant flows upward (moves upward) from the lower tank 422 and a plurality of radiator fins (not illustrated) each having through-holes that allow the tubes to pass therethrough. The tubes are formed as tubular members extending in the vertical direction. The tubes have predetermined heat conductivity. The upstream end (the lower end in the vertical direction) of each of the tubes is connected to the lower tank 422, and the downstream end (the upper end in the vertical direction) is connected to the upper tank 423.

The lower tank 422 (an inlet coolant reservoir) is a tank having an elongated shape. The lower tank 422 temporarily reserves the coolant flowing therein via a pipe c4. The lower tank 422 is connected to the outlet port of the coolant flow passage 13 via the pipe c4. Note that a "first coolant exhaust flow passage" that connects the outlet port of the coolant flow passage 13 to the lower tank 422 and that allows the coolant exhausted from the coolant flow passage 13 to flow therethrough includes the pipe c4.

The upper tank 423 (an outlet coolant reservoir) is a tank having an elongated shape. The upper tank 423 temporarily reserves the coolant flowing therein via the tubes. The upper tank 423 is connected to the thermostat valve 43 via a pipe c1. Note that a "first coolant supply flow passage" that connects the upper tank 423 to the inlet port of the coolant flow passage 13 and that allows the coolant supplied to the coolant flow passage 13 to flow therethrough includes the pipes c1, c2, and c3. Also, note that a radiator fan (not illustrated) that operates under the control of the ECU 80 and sends air to the radiator 42 is disposed in the vicinity of the radiator 42.

The thermostat valve 43 (a first switching unit) switches between a mode in which the coolant flows through the radiator 42 and a mode in which the coolant bypasses the radiator 42 in accordance with the temperature of the coolant. Thus, the thermostat valve 43 serves as a temperature regulating mechanism that regulates the temperature of the fuel cell 10. The thermostat valve 43 includes wax (not illustrated) that inflates when the temperature of the coolant is higher than or equal to a predetermined value and a valving element (not illustrated) that is moved by the inflation of the wax. One of the inlet ports of the thermostat valve 43 is connected to the upper tank 423 via the pipe c1, and the other inlet port is connected to a bypass pipe c5. In addition, the outlet port of the thermostat valve 43 is connected to the intake port of the coolant pump 41 via the pipe c2.

If the temperature of the coolant flowing through the thermostat valve 43 (i.e., the temperature of the fuel cell 10) is higher than or equal to a predetermined value, the wax inflates and, thus, the pipes c1 and c2 communicates with each other. Accordingly, the flow channel through the bypass pipe c5 is blocked. However, if the temperature of the coolant flowing through the thermostat valve 43 is lower than the predetermined value, wax does not inflate and, thus, the bypass pipe c5 communicates with the pipe c2. Accordingly, the flow channel through the pipe c1 is blocked.

Note that a temperature threshold value for switching between the mode in which the coolant flows through the radiator 42 and the mode in which the coolant bypasses the radiator 42 (i.e., a temperature threshold value for determining whether the wax of the thermostat valve 43 inflates) is preset so that the electrode reaction of the fuel cell 10 can appropriately continue.

One end of the bypass pipe c5 (a first bypass flow passage) is connected to the thermostat valve 43 so that the coolant bypasses the radiator 42. The other end is connected to the pipe c4. Note that a "coolant circulation flow passage" that circulates the coolant flowing out of the coolant flow passage 13 of the fuel cell 10 and returns the coolant to the coolant flow passage 13 includes the pipes c1 to c4 and the bypass pipe c5. The temperature sensor 44 detects the temperature of the coolant that circulates through the pipe c4 as the temperature of the fuel cell 10 and outputs the detected temperature information to the ECU 80.

Electricity Consumption System

The electricity consumption system includes a voltage control unit (VCU) 51 and a drive motor 52. The VCU 51 controls the amount of electricity generated by the fuel cell 10 and charge and discharge of a battery (not illustrated). The VCU 51 includes electronic circuits, such as a DC/DC chopper (not illustrated) and a DC/DC converter (not illustrated). The drive motor 52 is, for example, a permanent magnetic synchronized three-phase AC motor. The drive motor 52 rotatingly drives the drive wheels of a fuel cell vehicle.

Air Conditioning Coolant System

The air conditioning coolant system includes a coolant pump 61, a coolant heating heater 62, a heater core 63, and a temperature sensor 64. The coolant pump 61 (a second coolant circulation unit) operates under the control of the ECU 80 and pumps the coolant to the heater core 63. An intake portion of the coolant pump 61 is connected to the lower tank 422 via a pipe d1, and an exhaust portion of the coolant pump 61 is connected to the coolant heating heater 62 via a pipe d2.

The coolant heating heater 62 is an electric heater that heats the coolant flowing in via the pipe d2 under the control of the ECU 80. A downstream portion of the coolant heating heater 62 is connected to an inlet port of the heater core 63 via a pipe d3. Note that a "second coolant supply flow passage" that allows the coolant supplied to the heater core 63 to pass therethrough includes the pipes d1 to d3.

The heater core 63 (a second heat exchanger) is a heat exchanger that exchanges heat between the high-temperature coolant flowing in via the pipe d3 and air introduced through an air mix door 74 and flowing through a duct 71. The heater core 63 is disposed in the duct 71 downstream of an evaporator 73. The outlet port of the heater core 63 is connected to the lower tank 422 via a pipe d4. Note that a "second coolant exhaust flow passage" that allows the coolant exhausted from the heater core 63 to flow therethrough includes the pipe d4.

In addition, a "waste heat recovery flow passage" that branches the flow of the coolant circulating through the coolant circulation flow passage including the pipes c1 to c4 and that recovers waste heat of the fuel cell 10 includes the pipes d1 to d4. As illustrated in FIG. 1, an upstream end P2 and a downstream end P3 of the waste heat recovery flow passage are connected to the lower tank 422 of the radiator 42. The temperature sensor 64 detects the temperature of the coolant flowing out of the coolant heating heater 62 and outputs the detected temperature information to the ECU 80.

Pipe Connection Points in Radiator

Connection points of the lower tank 422 in the radiator 42 at which the pipes c4, d1, and d4 are connected are described below. In the lower tank 422 having an elongated shape, a connection point P1 between the pipe c4 and the lower tank 422, a connection point (the upstream end) P2 between the pipe d1 and the lower tank 422, and a connection point (the downstream end) P3 between the pipe d4 and the lower tank 422 are arranged in sequence from the left of FIG. 1. In addition, the pipes c4, d1, and d4 are connected to the lower tank 422 such that a distance ΔL1 between the connection points P1 and P2 is less than a distance ΔL2 between the connection points P2 and P3.

In this manner, the high-temperature coolant that has entered the lower tank 422 via the pipe c4 can easily flow into the pipe d1. In addition, the low-temperature coolant that returns to the lower tank 422 via the pipe d4 negligibly merges with the high-temperature coolant that enters the lower tank 422 via the pipe c4. As a result, the waste heat of the fuel cell 10 can be highly efficiently recovered and be used as a heat source for the vehicle interior heating.

Other Equipment
Other Equipment

As illustrated in FIG. 1, the duct 71 is a tubular member. The upstream end of the duct 71 is open to communicate with the inside and outside of the vehicle, and the downstream end is open to communicate with the interior of the vehicle. In the duct 71, an air blower 72, the evaporator 73, the air mix door 74, and the heater core 63 are arranged in sequence from the upstream side.

The air blower 72 draws air from the inside and outside of the vehicle and sends the air into the duct 71. The air blower 72 is disposed in the vicinity of the upstream end of the duct 71. The evaporator 73 cools the air sent from the air blower 72. The evaporator 73 operates during a vehicle interior cooling operation. Note that although not illustrated in FIG. 1, a compressor (not illustrated), a condenser (not illustrated), an expansion valve (not illustrated), and the evaporator 73 are sequentially connected in a circular pattern using pipes (not illustrated). By driving the compressor and reducing the opening of the expansion valve, low-temperature and low-pressure coolant flows into the evaporator 73.

The air mix door 74 is formed as, for example, a swing door. The air mix door 74 swings about a swing axis K under the control of the ECU 80. In this manner, the flow ratio of the air flowing into the heater core 63 to the air bypassing the heater core 63 (i.e., the temperature of the air sent to the inside of the vehicle) can be controlled. Note that instead of the air mix door 74 that is swingable illustrated in FIG. 1, an air mix door that is slidable may be employed.

A temperature sensor 75 is disposed downstream of the evaporator 73 and upstream of the heater core 63. The temperature sensor 75 detects the temperature of the air heat-exchanged with the coolant flowing through the evaporator 73 and outputs the detected temperature information to the ECU 80. An air conditioning switch 76 is disposed in, for example, a center cluster (not illustrated) in the vehicle. When operated by an operator, the air conditioning switch 76 outputs an air conditioning on/off signal to the ECU 80.

Control System

The ECU 80 includes electronic circuits, such as a central processing unit (CPU), a read only memory (ROM), a random access memory (RAM), and a variety of interfaces. The ECU 80 provides a variety of functions in accordance with programs stored therein. The ECU 80 controls the operations of the devices in accordance with, for example, an on/off signal input from an ignition switch (IG) (not illustrated), the temperature information input from the temperature sensors 44 and 64, the on/off signal input from the air conditioning switch 76, and preset temperature information set by the operator. That is, the ECU 80 performs overall control of the operations of, for example, the shut-off valve 22, the compressor 31, the coolant pumps 41 and 61, the VCU 51, the coolant heating heater 62, the air blower 72, and the air mix door 74 in response to the variety of signals input thereto. Note that the ECU 80 may be separated from an air conditioning ECU and a fuel cell system control ECU. Alternatively, the ECU 80 may be integrated with the air conditioning ECU and the fuel cell system control ECU.

Operation Performed by Waste Heat Recovery System

Figure 2:
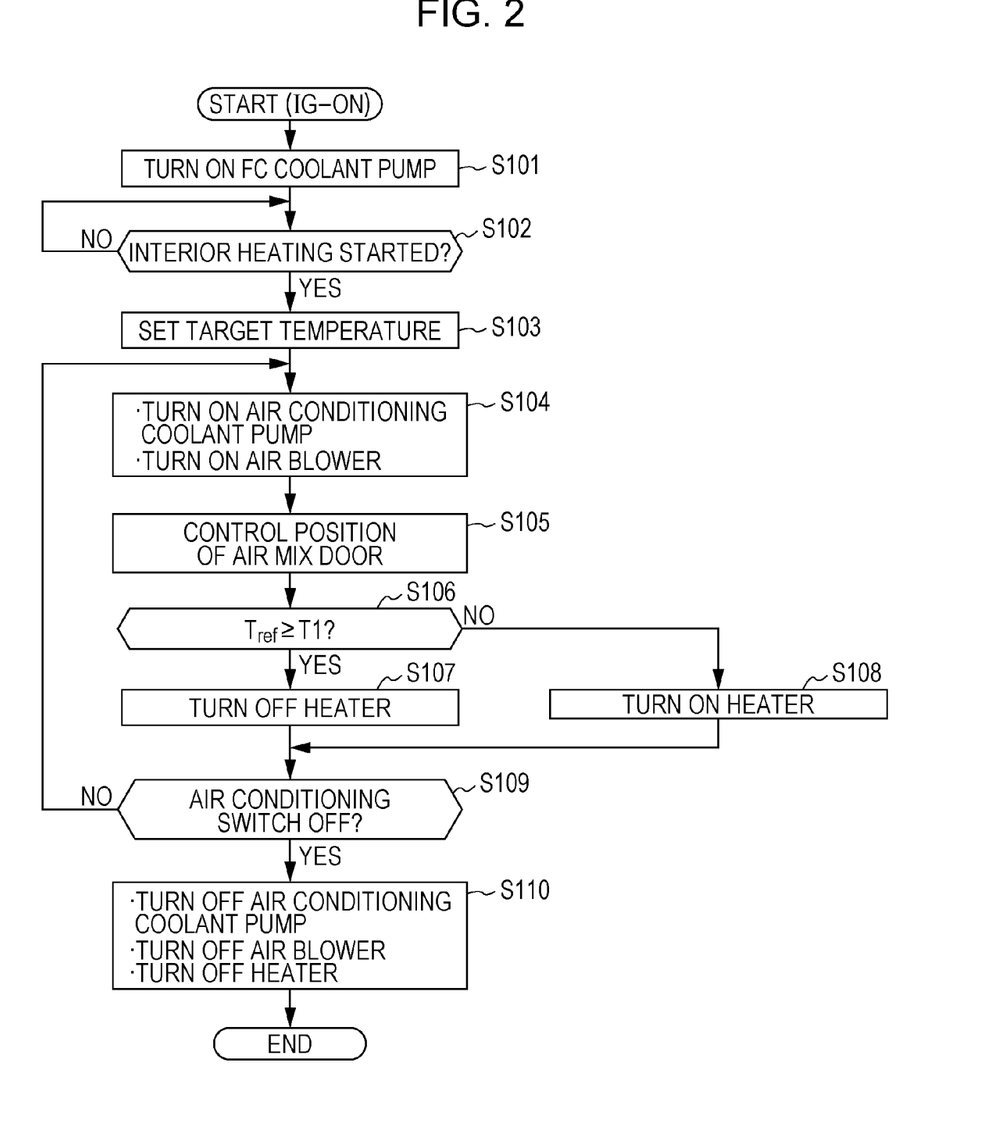
FIG. 2 is a flowchart illustrating the operation flow of the waste heat recovery system.

As illustrated in FIG. 2, upon receiving an ON signal from the IG (not illustrated) (START), the ECU 80 determines whether the coolant pump 41 of the FC coolant system needs to be operated on the basis of, for example, the temperature of the fuel cell 10. If the coolant pump 41 of the FC coolant system needs to be operated, the processing proceeds to step S101, where the coolant pump 41 of the FC coolant system is driven. Normally, when IG is turned on, the temperature of the fuel cell 10 is lower than a predetermined temperature suitable for electricity generation (e.g., 65° C.). Accordingly, the thermostat valve 43 is closed (that is, the flow passage through the pipe c1 is blocked, and the flow passage through the bypass pipe c5 allows coolant to pass therethrough).

Note that although not illustrated in the flowchart in FIG. 2, after the IG is turned on, the ECU 80 drives the compressor 31 and opens the shut-off valve 22. Thus, hydrogen is supplied to the anode flow passage 11 of the fuel cell 10, and air containing oxygen is supplied to the cathode flow passage 12. Accordingly, the electrode reaction occurs in the membrane electrode assembly and, thus, the fuel cell 10 generates heat.

If, at that time, the coolant pump 41 is driven, the relatively low-temperature coolant flowing out of the coolant flow passage 13 of the fuel cell 10 bypasses the radiator 42 and flows through the pipe c4, the bypass pipe c5, and the pipes c2 and c3. Thereafter, the coolant returns to the coolant flow passage 13.

Subsequently, if the temperature of the coolant reaches a predetermined temperature or higher due to the heat generated by the fuel cell 10, the thermostat valve 43 is made open. That is, the flow passage through the pipe c1 allows the coolant to pass therethrough, and the flow passage through the bypass pipe c5 is blocked. Note that the thermostat valve 43 is opened or closed by a variation of the volume of the wax disposed inside caused by a change in the temperature of the coolant.

If the thermostat valve 43 is open, the high-temperature coolant flowing out of the coolant flow passage 13 flows into the lower tank 422 of the radiator 42 via the pipe c4. Thereafter, when flowing through a plurality of tubes (not illustrated), the coolant exchanges heat with air (e.g., air passing through the radiator 42 due to the forward motion of the vehicle) via the tubes and a radiator fin (not illustrated). The coolant that has dissipated heat through the heat exchange returns to the coolant flow passage 13 via the upper tank 423 and the pipes c1 to c3. In this manner, the fuel cell 10 can be maintained at an appropriate temperature. Note that circulation of the coolant in the air conditioning coolant system is described in more detail below.

In step S102, the ECU 80 determines whether the vehicle interior heating needs to start. This determination is made on the basis of a temperature sensor (not illustrated) that detects the vehicle interior temperature, a plurality of temperature sensors (not illustrated) that detects the vehicle exterior temperatures, and a preset temperature set by the operator when an ON signal is input from the air conditioning switch 76. If vehicle interior heating needs to start (Yes in step S102), the processing performed by the ECU 80 proceeds to step S103. However, if the vehicle interior heating need not start (No in step S102), the ECU 80 repeats the process in step S102.

In step S103, the ECU 80 sets a target temperature. That is, the ECU 80 sets the target temperature at a position at which the temperature sensor 75 (refer to FIG. 1) is mounted on the basis of, for example, the preset temperature set by the operator.

In step S104, the ECU 80 drives the coolant pump 61 and the air blower 72 of the air conditioning coolant system. Accordingly, the high-temperature coolant flowing out of the fuel cell 10 branches into the heater core 63 via the pipe c4, the lower tank 422, and the pipes d1 to d3.

At that time, as illustrated in FIG. 1, the distance ΔL1 between the connection points P1 and P2 is less than the distance ΔL2 between the connection points P2 and P3. Accordingly, the low-temperature coolant flowing into the lower tank 422 via the pipe d4 negligibly merges with the high-temperature coolant flowing into the lower tank 422 via the pipe c4. Thus, waste heat of the fuel cell 10 can be recovered with high efficiency. In addition, since the pressure is substantially uniform throughout the interior of the lower tank 422, a pressure difference between the connection points P2 and P3 negligibly occur. Consequently, undue load is not imposed on the coolant pump 61. Note that since the coolant pump 41 of the FC coolant system is also operating (step S101), the heat exchange in the radiator 42 continues.

In step S105, the ECU 80 controls the position of the air mix door 74 on the basis of, for example, the target temperature set in step S103. As a result, the air sent into the duct 71 by the air blower 72 flows in the heater core 63 at a flow rate in accordance with the position of the air mix door 74. The coolant flowing out of the lower tank 422 via the pipe d1 flows into the heater core 63 via the pipes d2 and d3. The high-temperature coolant that flows through the heater core 63 dissipates heat to the air sent from the air blower 72. Accordingly, waste heat (surplus heat) of the fuel cell 10 can be used as a heat source of the vehicle interior heating and, thus, the energetic efficiency of the whole system can be increased.

In contrast, the air that flows through the heater core 63 absorbs heat from the coolant and, thereafter, is sent into the vehicle interior via the duct 71. In addition, the low-temperature coolant flowing out of the heater core 63 returns to the lower tank 422 via the pipe d4 and, thereafter, is pumped to the coolant flow passage 13 of the fuel cell 10.

In step S106, the ECU 80 determines whether a temperature $T_{ref}$ of the coolant detected by the temperature sensor 64 is higher than or equal to a predetermined temperature T1. The predetermined temperature T1 is preset so that the vehicle interior heating can be appropriately performed. If the temperature $T_{ref}$ of the coolant is higher than or equal to the predetermined temperature T1 (Yes in step S106), the processing performed by the ECU 80 proceeds to step S107, where the ECU 80 turns off the coolant heating heater 62.

However, if the temperature $T_{ref}$ of the coolant is lower than the predetermined temperature T1 (No in step S106), the processing performed by the ECU 80 proceeds to step S108, where the ECU 80 turns on the coolant heating heater 62. In this manner, the temperature of the coolant flowing into the heater core 63 can be maintained at a temperature that is suitable for the vehicle interior heating.

In step S109, the ECU 80 determines whether an Off signal is input from the air conditioning switch 76. If an Off signal is input from the air conditioning switch 76 (Yes in step S109), the processing performed by the ECU 80 proceeds to step S110, where the ECU 80 stops driving the coolant pump 61, the air blower 72, and the coolant heating heater 62. Thereafter, the ECU 80 completes the processing (END). However, if an Off signal is not input from the air conditioning switch 76 (No in step S109), the processing performed by the ECU 80 returns to step S104.

Advantages

In the waste heat recovery system S according to the present exemplary embodiment, the heat of the high-temperature coolant flowing into the lower tank 422 of the radiator 42 is waste heat generated by an increase in the temperature of the fuel cell 10. By using only the waste heat of the fuel cell 10 as the heat source of the vehicle interior heating in this manner, the need for undue load imposed on the fuel cell 10 (e.g., shortfall of heat for air heating is compensated for by electricity generation of the fuel cell 10) can be eliminated. As a result, the energetic efficiency of the whole system can be increased.

In addition, the pressure is uniform throughout the interior of the lower tank 422 having the upstream end P2 and the downstream end P3 of the waste heat recovery flow passage (including the pipes d1 to d4) connected thereto. That is, a pressure difference between the upstream end P2 and the downstream end P3 negligibly occurs. Accordingly, the above-described undue load for cancelling out the pressure difference is not imposed on the coolant pump 61 and, thus, the energetic efficiency of the entire system can be increased.

Furthermore, according to the present exemplary embodiment, a device for recovering waste heat of the fuel cell 10 (e.g., a valve for preventing backflow of the coolant) need not be additionally provided. Accordingly, the cost of the waste heat recovery system S can be reduced. Still furthermore, since the temperature can be controlled by turning on or off the coolant heating heater 62 as necessary, control performed when the waste heat of the fuel cell 10 is used for the vehicle interior heating can be significantly simplified.

Yet still furthermore, the distance ΔL1 between the connection points P1 and P2 is less than the distance ΔL2 between the connection points P2 and P3. Accordingly, the high-temperature coolant flowing into the lower tank 422 via the pipe c4 is prevented from merging with the low-temperature coolant flowing into the lower tank 422 via the pipe d4. As a result, the waste heat of the fuel cell 10 can be recovered as the heat source of the vehicle interior heating with high efficiency.

Second Exemplary Embodiment

Figure 3:
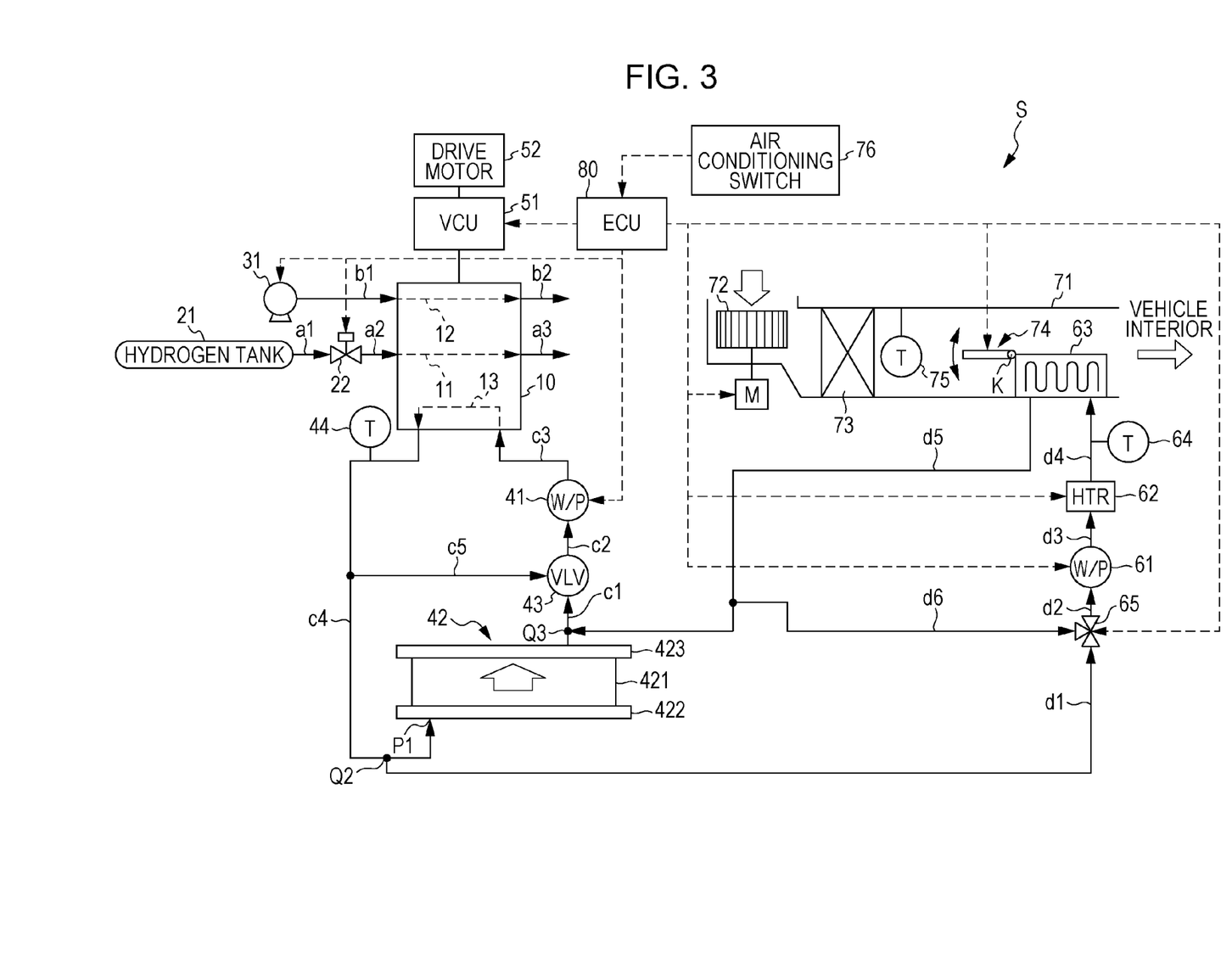
FIG. 3 is a block diagram illustrating the configuration of a waste heat recovery system according to a second exemplary embodiment of the present disclosure.

Unlike the waste heat recovery system S according to the first exemplary embodiment, a waste heat recovery system S according to a second exemplary embodiment has a bypass pipe d6 and a three-way valve 65 provided therein. In addition, the connection points of an upstream end Q2 and a downstream end Q3 of the waste heat recovery flow passage including pipes d1 to d5 differs from those of the waste heat recovery system S of the first exemplary embodiment. The other configurations are the same as those of the waste heat recovery system S of the first exemplary embodiment. Therefore, only portions that differ from those of the first exemplary embodiment are described below, and descriptions of the other portions are not repeated.

Configuration of Waste Heat Recovery System

As illustrated in FIG. 3, one end of the bypass pipe d6 (a second bypass flow passage) is connected to the three-way valve 65, and the other end is connected to the pipe d5. That is, one end of the bypass pipe d6 is connected to the second coolant supply flow passage (the pipes d1 to d4), and the other end is connected to the second coolant exhaust flow passage (the pipe d5).

The three-way valve 65 (a second switching unit) is configured to switch between a mode in which the coolant flowing out of the heater core 63 is returned to the heater core 63 via the bypass pipe d6 and the pipes d2 to d4 and a mode in which the coolant flowing out of the heater core 63 flows towards the downstream end Q3 of the pipe d5 (the downstream end of the waste heat recovery flow passage). An inlet port of the three-way valve 65 is connected to the pipe c4 at the upstream end Q2 via the pipe d1. In addition, one of two outlet ports of the three-way valve 65 is connected to the intake port of the coolant pump 61 via the pipe d2, and the other outlet port is connected to the bypass pipe d6.

Furthermore, as illustrated in FIG. 3, the upstream end Q2 of the pipe d1 is connected to the pipe c4 at a point downstream of the connection point between the pipe c4 and the bypass pipe c5. The downstream end Q3 of the pipe d5 is connected to the pipe c1 at a position upstream of the coolant pump 41.

Operation Performed by Waste Heat Recovery System

Figure 4:
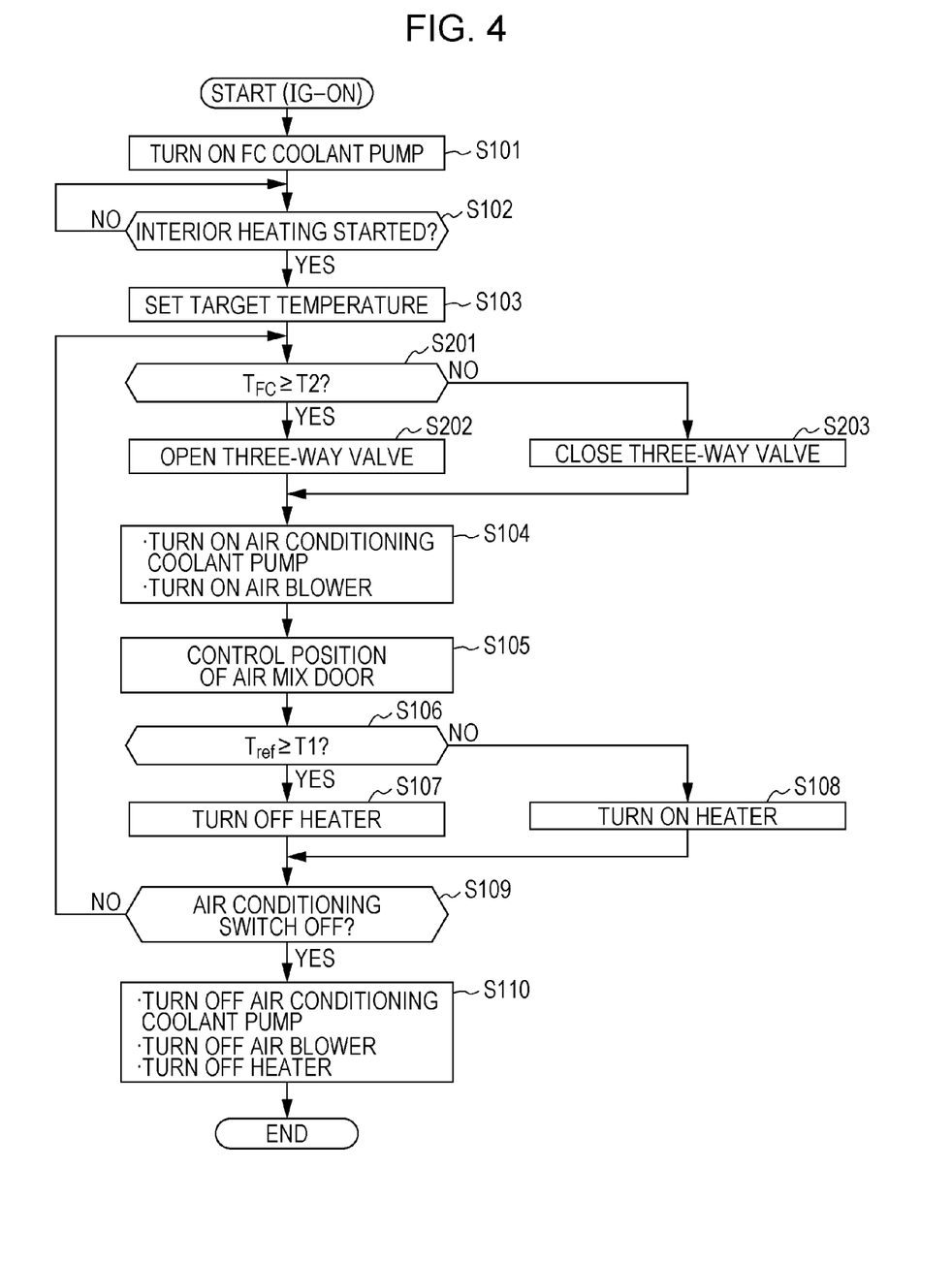
FIG. 4 is a flowchart illustrating the operation flow of the waste heat recovery system.

Steps S101 to S103 illustrated in FIG. 4 are the same as those of the first exemplary embodiment (refer to FIG. 2) and, thus, description of the steps are not repeated. After the process in step S103 is performed, the ECU 80, in step S201, determines whether a temperature $T_{FC}$ of the fuel cell 10 detected by the temperature sensor 44 is higher than or equal to a predetermined temperature T2. The predetermined temperature T2 is used as a reference value for determining whether waste heat to be recovered is generated in the fuel cell 10 (i.e., whether the thermostat valve 43 is open). The predetermined temperature T2 is preset.

If the temperature $T_{FC}$ of the fuel cell 10 is higher than or equal to the predetermined temperature T2 (Yes in step S201), the processing performed by the ECU 80 proceeds to step S202. In step S202, the ECU 80 opens the three-way valve 65 so that the pipe d1 communicates with the pipe d2. At that time, the thermostat valve 43 is also open (Yes in step S201). Accordingly, the high-temperature coolant flowing out of the coolant flow passage 13 of the fuel cell 10 enters the lower tank 422 of the radiator 42.

The high-temperature coolant flowing out of the lower tank 422 via the pipe d1 flows into the heater core 63 via the pipes d2 to d4. The high-temperature coolant flowing through the heater core 63 dissipates heat to the air sent by the air blower 72. The low-temperature coolant flowing out of the heater core 63 returns to the lower tank 422 via the pipe d5 and, thereafter, is pumped to the coolant flow passage 13 of the fuel cell 10.

However, if the temperature $T_{FC}$ of the fuel cell 10 is lower than the predetermined temperature T2 (No in step S201), the processing performed by the ECU 80 proceeds to step S203. In step S203, the ECU 80 closes the three-way valve 65 so that the flow passage through the pipe d1 is blocked and the pipe d2 is allowed to communicate with the bypass pipe d6. When the coolant pump 61 is driven (step S104), the coolant bypasses the radiator 42 and circulates through the pipes d2 to d4, the heater core 63, part of the pipe d5, and the bypass pipe d6.

As described above, if waste heat is not generated by the fuel cell 10 (No in step S201), the ECU 80 circulates the coolant so that the coolant bypasses the radiator 42 in the air conditioning coolant system. Note that heat required for the heater core 63 is generated by supplying an electric current to the coolant heating heater 62 (No in step S106 and step S108). In this manner, if waste heat (surplus heat) is not generated in the fuel cell 10, the low-temperature coolant is prevented from flowing to the heater core 63 via the pipes c4 and d1. Thus, the load imposed on the coolant heating heater 62 can be reduced.

Advantages

According to the present exemplary embodiment, if the temperature $T_{FC}$ of the fuel cell reaches the predetermined temperature T2 or higher (Yes in step S201), the high-temperature coolant flows into the lower tank 422 by the operation of the thermostat valve 43. As described above, the thermostat valve 43 switches the flow direction of the coolant due to a variation of the volume of inside wax. Accordingly, the ECU 80 need not perform complicated control. In this manner, the control performed by the ECU 80 to recover the waste heat of the fuel cell 10 can be simplified.

In addition, the pipe d5 is connected to the pipe c1 located upstream of the coolant pump 41. Accordingly, when the waste heat of the fuel cell 10 is used as a heat source of the vehicle interior heating, flow of the coolant through the pipes d1 to d5 can be assisted by a negative pressure generated on the intake side of the coolant pump 41.

While the present exemplary embodiment has been described with reference to the three-way valve 65 disposed at a connection point of the pipes d1 and d2 and the bypass pipe d6, the location of the three-way valve 65 is not limited thereto. That is, instead of the location illustrated in FIG. 3, a three-way valve may be disposed at a connection point between the pipe d5 and the bypass pipe d6 (i.e., at the left end of the bypass pipe d6 in FIG. 3).

Third Exemplary Embodiment

Figure 5:
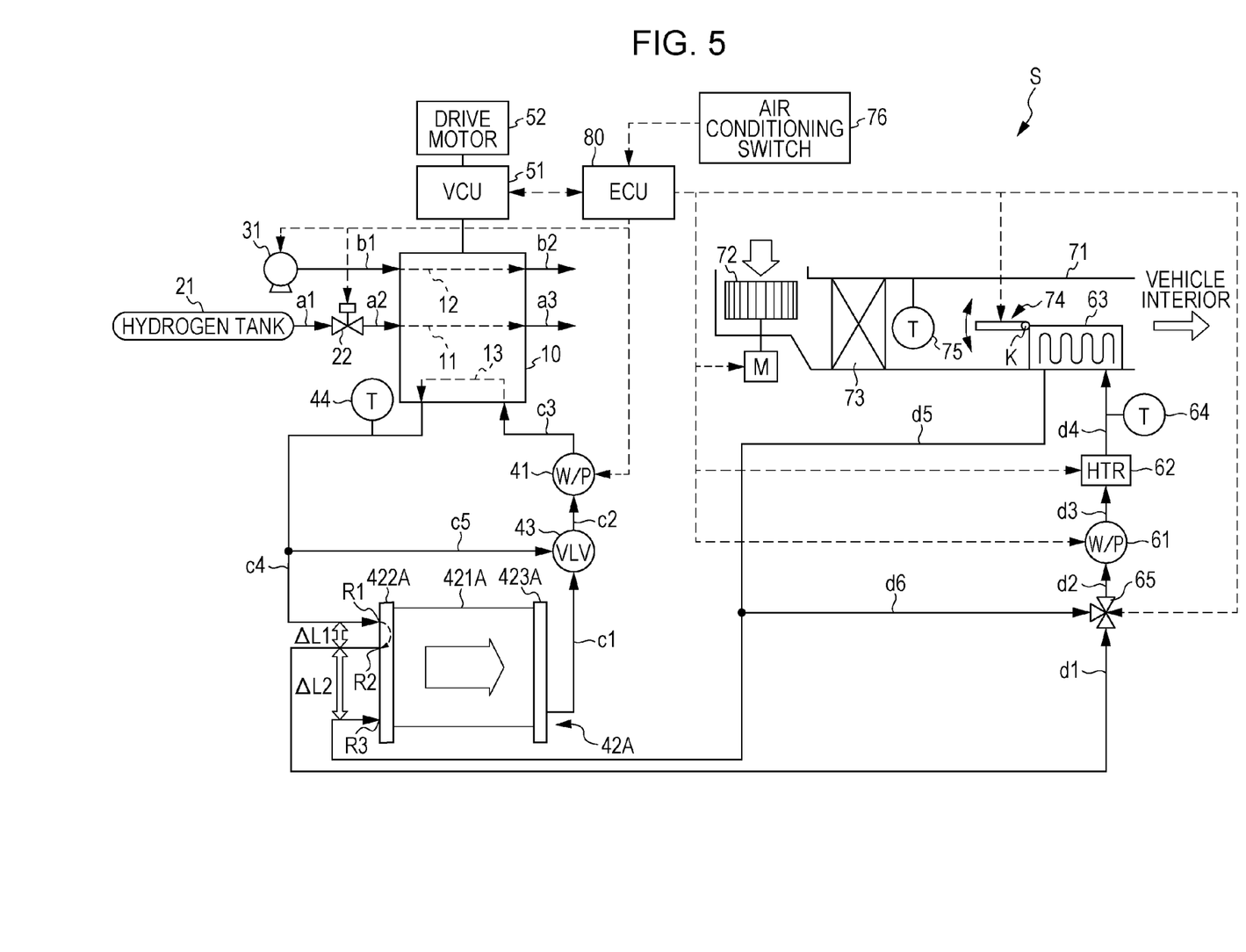
FIG. 5 is a block diagram illustrating the configuration of a waste heat recovery system according to a third exemplary embodiment of the present disclosure.

Unlike the first exemplary embodiment, in a third exemplary embodiment, a tube (not illustrated) that connects an inlet coolant tank 422A to an outlet coolant tank 423A of a radiator 42A extends in the horizontal direction. In addition, the bypass pipe d6 and the three-way valve 65 are additionally provided. Accordingly, portions that differ from those of the first exemplary embodiment are described below, and descriptions of the portions that are the same as those of the first exemplary embodiment are not repeated.

Configuration of Waste Heat Recovery System

As illustrated in FIG. 5, the radiator 42A includes the inlet coolant tank 422A having an elongated shape (the inlet coolant reservoir) and the outlet coolant tank 423A having an elongated shape (the outlet coolant reservoir) disposed so as to extend in the vertical direction. A heat dissipation unit 421A includes a plurality of tubes (not illustrated) extending in the horizontal direction and a radiator fin having a plurality of through-holes (not illustrated) that allow the tubes to pass therethrough.

The upstream end (the left end in FIG. 5) of each of the tubes is connected to the inlet coolant tank 422A, and the downstream end (the right end in FIG. 5) is connected to the outlet coolant tank 423A. Accordingly, when the temperature of the fuel cell 10 increases and if the thermostat valve 43 is open, the high-temperature coolant horizontally flows in the right direction in FIG. 5 through the tubes of the radiator 42A.

In addition, in the inlet coolant tank 422A, a connection point R1 between the pipe c4 and the inlet coolant tank 422A, a connection point R2 between the pipe d1 and the inlet coolant tank 422A, and a connection point R3 between the pipe d5 and the inlet coolant tank 422A are sequentially arranged from the top in the vertical direction. In addition, the pipes c4, d1, and d5 are connected to the inlet coolant tank 422A so that the distance ΔL1 between the connection points R1 and R2 is greater than the distance ΔL2 between the connection points R2 and R3.

By connecting the pipes c4, d1, and d5 in this manner, the high-temperature coolant flowing into the inlet coolant tank 422A via the pipe c4 can be prevented from merging with the low-temperature coolant flowing into the inlet coolant tank 422A via the pipe d5. In addition, the density of the coolant decreases with increasing temperature of the coolant, and the coolant easily rises. Accordingly, in the temperature distribution of the coolant in the inlet coolant tank 422A, the temperature increases upward. As illustrated in FIG. 5, the pipe c4 that allows the high-temperature coolant to pass therethrough is connected to the inlet coolant tank 422A at a position higher than the pipe d5 that allows the low-temperature coolant to pass therethrough. In this manner, merging of the high-temperature coolant with the low-temperature coolant in the inlet coolant tank 422A can be effectively prevented.

Note that the connection relationship between the bypass pipe d6 and the three-way valve 65 and the processing performed by the ECU 80 are the same as those of the second exemplary embodiment and, thus, descriptions thereof are not repeated.

Advantages

According to the present exemplary embodiment, even when the radiator 42A is disposed so that the tubes (not illustrated) extends horizontally, the waste heat of the fuel cell 10 can be efficiently recovered with simplified control and be used for vehicle interior heating. In addition, by connecting the pipes c4, d1, and d5 so that the connection points R1, R2, and R3 are sequentially arranged from the top, the high-temperature coolant can be prevented from merging with the low-temperature coolant in the inlet coolant tank 422A. As a result, the waste heat of the fuel cell 10 can be recovered as the heat source of the vehicle air heating with high efficiency.

Modifications

While the waste heat recovery system S has been described with reference to the above exemplary embodiments, the configuration of the waste heat recovery system S is not limited thereto, and a variety of modifications can be made. For example, in the FC coolant system according to the first and second exemplary embodiments, the pipes are connected so that the lower tank 422 (disposed at a lower position than the upper tank 423 in the vertical direction) is located upstream of the upper tank 423. However, the configuration is not limited thereto. That is, the pipe c4, d1, and d4 illustrated in FIG. 1 may be connected to the upper tank 423, and the pipe c1 may be connected to the lower tank 422. In such a case, the lower tank 422 is located downstream of the upper tank 423.

In addition, while the above exemplary embodiment have been described with reference to the "first switching unit", which switches the flow direction of the coolant, formed from the thermostat valve 43, the "first switching unit" is not limited a thermostat valve. That is, instead of the thermostat valve 43, a three-way valve including a solenoid and a valving element may be used. Alternatively, an electric thermostat valve including a heater may be used so that the flowing direction of the coolant is switchable by heating wax using the heater even when the temperature of the fuel cell 10 is relatively low.

In addition, two on-off valves may be used as the "first switching unit" and/or the "second switching unit" that switches the flow direction of the coolant. For example, instead of the three-way valve 65 illustrated in FIG. 3, an on-off valve may be provided in each of the pipe d1 and the bypass pipe d6. Furthermore, while the first exemplary embodiment has been described with reference to the case in which the pipe c1, d1, and d4 are connected to the lower tank 422 so that the connection points P1, P2, and P3 are sequentially arranged, the positional relationship is not limited thereto. That is, the positional relationship among the connection points P1, P2, and P3 may be appropriately changed. This can apply to the second and third exemplary embodiments.

In addition, while the above embodiments have been described with reference to the coolant pump 41 of the FC coolant system connected to the inlet port of the coolant flow passage 13 via the pipe c3, the configuration is not limited thereto. For example, a coolant pump may be disposed in the pipe c4 at a position upstream of a connection point between the pipe c4 and the bypass pipe c5. Furthermore, the above-described exemplary embodiments can be appropriately combined. For example, by combining the first exemplary embodiment with the third exemplary embodiment, the bypass pipe d6 and the three-way valve 65 may be removed from the waste heat recovery system S illustrated in FIG. 5.

In addition, for example, the upstream end of the pipe d1 may be connected to the pipe c4 (refer to FIG. 3), and the downstream end of the pipe d5 may be connected to the upper tank 423. Alternatively, the downstream end of the pipe d5 may be connected to any one of the pipe c1, the pipe c2, and the pipe c3. That is, the upstream end of the waste heat recovery flow passage may be connected to one of the pipe c4 at a position downstream of the connection point between the pipe c4 and the bypass pipe c5 and the lower tank 422. In addition, the downstream end of the waste heat recovery flow passage may be connected to any one of the lower tank 422, the upper tank 423, and the first coolant supply flow passage including the pipes c1 to c3.

Still furthermore, while the above embodiments have been described with reference to the waste heat recovery system S mounted in an automobile, the configuration is not limited thereto. For example, the waste heat recovery system S may be mounted in a moving object, such as a train, a ship, or an airplane, or a stationary system. Yet still furthermore, while the above embodiments have been described with reference to hydrogen serving as fuel gas (reaction gas), natural gas, for example, may be employed as the fuel gas.

According to an embodiment of the present application, a waste heat recovery system includes a fuel cell including a reaction gas flow passage and a coolant flow passage, where the fuel cell generates electricity if reaction gas is supplied to the reaction gas flow passage, a coolant circulation flow passage configured to allow the coolant flowing out of the coolant flow passage to return to the coolant flow passage and circulate through the coolant flow passage, a first heat exchanger disposed in the coolant circulation flow passage, where the first heat exchanger causes the coolant to dissipate heat through heat exchange with air, a first coolant circulation unit disposed in the coolant circulation flow passage, where the coolant circulation flow passage causes the coolant to circulate, a first switching unit disposed in the coolant circulation flow passage, where the first switching unit switches a flow direction of the coolant so that the coolant flows through the first heat exchanger if the temperature of the fuel cell is higher than or equal to a predetermined value, a waste heat recovery flow passage configured to branch the coolant circulating through the coolant circulation flow passage and recover waste heat of the fuel cell through heat exchange with air, and a second heat exchanger disposed in the waste heat recovery flow passage, where the second heat exchanger exchanges heat between air conditioning air and the coolant, and a second coolant circulation unit disposed in the waste heat recovery flow passage, where the second coolant circulation unit circulates the coolant. The first heat exchanger includes an inlet coolant reservoir that reserves the coolant flowing out of the coolant flow passage, a heat dissipation unit configured to dissipate heat of the coolant flowing out of the inlet coolant reservoir through heat exchange with air, and the outlet coolant reservoir that reserves the coolant that has dissipated heat in the heat dissipation unit. The coolant circulation flow passage includes a first coolant supply flow passage that is connected to the outlet coolant reservoir and an inlet port of the coolant flow passage and that allows the coolant to be supplied to the coolant flow passage to pass therethrough, a first coolant exhaust flow passage that is connected to an outlet port of the coolant flow passage and the inlet coolant reservoir and that allows the coolant exhausted from the coolant flow passage to pass therethrough, and a first bypass flow passage that is connected to the first coolant supply flow passage and the first coolant exhaust flow passage so as to bypass the first heat exchanger. An upstream end of the waste heat recovery flow passage is connected to one of the first coolant exhaust flow passage at a position downstream of a connection point between the first coolant exhaust flow passage and the first bypass flow passage and the inlet coolant reservoir. A downstream end of the waste heat recovery flow passage is connected to one of the inlet coolant reservoir, the outlet coolant reservoir, and the first coolant supply flow passage.

According to such a configuration, if the temperature is higher than or equal to the fuel cell, the first switching unit switches the flow direction of the coolant so that the coolant circulates through the first heat exchanger. In such a case, the high-temperature coolant flowing out of the coolant flow passage of the fuel cell enters the first heat exchanger via the first coolant exhaust flow passage. Note that the heat of the coolant flowing into the first heat exchanger is waste heat (surplus heat) for maintaining the fuel cell at a suitable temperature. In addition, the upstream end of the waste heat recovery flow passage is connected to one of the first coolant exhaust flow passage at a position downstream of a connection point between the first coolant exhaust flow passage and the first bypass flow passage and the inlet coolant reservoir. Accordingly, when the second coolant circulation unit operates, the high-temperature coolant from the fuel cell enters the waste heat recovery flow passage. Thus, the heat is exchanged with air conditioning air in the second heat exchanger.

In addition, the downstream end of the waste heat recovery flow passage is connected to one of the inlet coolant reservoir, the outlet coolant reservoir, and the first coolant supply flow passage. Accordingly, the coolant that has dissipated heat through heat exchange with the air conditioning air returns to the coolant flow passage of the fuel cell via the first coolant supply flow passage. Thereafter, the coolant absorbs heat from the fuel cell again. In this manner, according to the embodiment, waste heat of the fuel cell can be easily recovered without performing complicated control, such as switching between control modes. Furthermore, since only the waste heat of the fuel cell need not be recovered (i.e., the fuel cell need not generate surplus heat), the energetic efficiency of the whole system can be increased.

Furthermore, the upstream end and the downstream end of the waste heat recovery flow passage can be connected to the inlet coolant reservoir, and it is desirable that a distance between a connection point between the first coolant exhaust flow passage and the inlet coolant reservoir and the upstream end be less than a distance between the upstream end and the downstream end.

According to such a configuration, since the pressure of the coolant is uniform throughout the interior of the inlet coolant reservoir, a pressure difference between the upstream end and the downstream end negligibly occurs. Therefore, the second coolant circulation unit can be driven without taking into account the pressure difference and, thus, control performed when the waste heat of the fuel cell is recovered can be simplified. In addition, the distance between a connection point between the first coolant exhaust flow passage and the inlet coolant reservoir and the upstream end be less than the distance between the upstream end and the downstream end of the waste heat recovery flow passage. Accordingly, the high-temperature coolant flowing into the inlet coolant reservoir via the first coolant exhaust flow passage does not merge with the low-temperature coolant flowing into the inlet coolant reservoir via the waste heat recovery flow passage and, thus, heat exchange therebetween can be prevented. As a result, the high-temperature coolant can be supplied from the inlet coolant reservoir via the waste heat recovery flow passage and, thus, waste heat of the fuel cell can be recovered with high efficiency.

Still furthermore, the first coolant circulation unit can be disposed in the first coolant supply flow passage, and it is desirable that a downstream end of the waste heat recovery flow passage be connected to the first coolant supply flow passage at a position upstream of the first coolant circulation unit.

According to such a configuration, the coolant that has circulated through the waste heat recovery flow passage merges with the coolant flowing through the coolant circulation flow passage at a position upstream of the first coolant circulation unit. That is, the coolant is pumped by the second coolant circulation unit in the coolant circulation flow passage. In addition, the coolant is sucked by a negative pressure generated on the side upstream of the first coolant circulation unit. Accordingly, as compared with the case in which the downstream end of the waste heat recovery flow passage is connected to the downstream of the first coolant circulation unit, the load imposed on the second coolant circulation unit can be reduced (e.g., backflow of the coolant is prevented) and, thus, the energetic efficiency of the whole system can be increased.

Yet still furthermore, it is desirable that the waste heat recovery flow passage include a second coolant supply flow passage that allows the coolant to be supplied to the second heat exchanger via the upstream end to pass therethrough, a second coolant exhaust flow passage that allows the coolant exhausted from the second heat exchanger to flow toward the downstream end, a second bypass flow passage having one end connected to the second coolant supply flow passage and the other end connected to the second coolant exhaust flow passage, and a second switching unit that switches between a mode in which the coolant flowing out of the second coolant exhaust flow passage returns to the second heat exchanger via the second bypass flow passage and the second coolant supply flow passage and a mode in which the coolant flowing out of the second coolant exhaust flow passage flows towards the downstream end.

According to such a configuration, a mode in which the coolant circulates through a flow passage including the second coolant exhaust flow passage, the second bypass flow passage, the second coolant supply flow passage, and the second heat exchanger and a mode in which the coolant flows towards the downstream end of the waste heat recovery flow passage can be switched by the second switching unit. Accordingly, for example, if the coolant bypasses the first heat exchanger using the first switching unit (i.e., the temperature of the fuel cell is lower than a predetermined value), the relatively low-temperature coolant reserved in the inlet coolant reservoir can be blocked from flowing into the second heat exchanger.

As described above, according to the embodiment of the present disclosure, a waste heat recovery system that recovers waste heat of the fuel cell using simplified control can be provided.

Obviously, numerous modifications and variations of the present invention are possible in light of the above teachings.

It is therefore to be understood that within the scope of the appended claims, the invention may be practiced otherwise than as specifically described herein.

What is claimed is:

1. A waste heat recovery system comprising:
a fuel cell including a reaction gas flow passage and a coolant flow passage, the fuel cell generating electricity if reaction gas is supplied to the reaction gas flow passage;
a coolant circulation flow passage configured to allow a coolant flowing out of the coolant flow passage to return to the coolant flow passage and circulate through the coolant flow passage;
a first heat exchanger disposed in the coolant circulation flow passage, the first heat exchanger causing the coolant to dissipate heat through heat exchange with air;
a first coolant circulation unit disposed in the coolant circulation flow passage, the first coolant circulation unit causing the coolant to circulate;
a first switching unit disposed in the coolant circulation flow passage, the first switching unit switching a flow direction of the coolant so that the coolant flows through the first heat exchanger if a temperature of the fuel cell is higher than or equal to a predetermined value;
a waste heat recovery flow passage configured to branch the coolant circulating through the coolant circulation flow passage and recover waste heat of the fuel cell through heat exchange with air;
a second heat exchanger disposed in the waste heat recovery flow passage, the second heat exchanger exchanging heat between air-conditioning air and the coolant; and
a second coolant circulation unit disposed in the waste heat recovery flow passage, the second coolant circulation unit circulating the coolant,
wherein the first heat exchanger includes an inlet coolant reservoir that reserves the coolant flowing out of the coolant flow passage, a heat dissipation unit configured to dissipate heat of the coolant flowing out of the inlet coolant reservoir through heat exchange with air, and an outlet coolant reservoir that reserves the coolant that has dissipated heat in the heat dissipation unit,
wherein the coolant circulation flow passage includes a first coolant supply flow passage that is connected to the outlet coolant reservoir and an inlet port of the coolant flow passage and that allows the coolant to be supplied to the coolant flow passage to pass therethrough, a first coolant exhaust flow passage that is connected to an outlet port of the coolant flow passage and the inlet coolant reservoir and that allows the coolant exhausted from the coolant flow passage to pass therethrough, and a first bypass flow passage that is connected to the first coolant supply flow passage and the first coolant exhaust flow passage so as to bypass the first heat exchanger,
wherein an upstream end of the waste heat recovery flow passage is connected to one of the first coolant exhaust flow passage at a position downstream of a connection point between the first coolant exhaust flow passage and the first bypass flow passage and the inlet coolant reservoir, and
wherein a downstream end of the waste heat recovery flow passage is connected to one of the inlet coolant reservoir, the outlet coolant reservoir, and the first coolant supply flow passage.

2. The waste heat recovery system according to claim 1, wherein the upstream end and the downstream end of the waste heat recovery flow passage are connected to the inlet coolant reservoir, and wherein a distance between a connection point between the first coolant exhaust flow passage and the inlet coolant reservoir and the upstream end is less than a distance between the upstream end and the downstream end.

3. The waste heat recovery system according to claim 1, wherein the first coolant circulation unit is disposed in the first coolant supply flow passage, and
wherein the downstream end of the waste heat recovery flow passage is connected to the first coolant supply flow passage at a position upstream of the first coolant circulation unit.

4. The waste heat recovery system according to claim 1, wherein the waste heat recovery flow passage includes a second coolant supply flow passage that allows the coolant to be supplied to the second heat exchanger via the upstream end to pass therethrough, a second coolant exhaust flow passage that allows the coolant exhausted from the second heat exchanger to flow toward the downstream end, a second bypass flow passage having one end connected to the second coolant supply flow passage and the other end connected to the second coolant exhaust flow passage, and a second switching unit that switches between a mode in which the coolant flowing out of the second coolant exhaust flow passage returns to the second heat exchanger via the second bypass flow passage and the second coolant supply flow passage and a mode in which the coolant flowing out of the second coolant exhaust flow passage flows towards the downstream end.

5. A waste heat recovery system comprising:
a fuel cell including a reaction gas flow passage and a coolant flow passage and configured to generate electricity by supplying reaction gas to the reaction gas flow passage;
a coolant circulation flow passage connected to the coolant flow passage to circulate a coolant in the coolant flow passage and the coolant circulation flow passage;
a first heat exchanger disposed in the coolant circulation flow passage to cool the coolant by heat exchange with air;
a first coolant circulator disposed in the coolant circulation flow passage to circulate the coolant in the coolant flow passage and the coolant circulation flow passage;
a first switching device disposed in the coolant circulation flow passage and configured to switch a flow direction of the coolant so that the coolant flows through the first heat exchanger if a temperature of the fuel cell is higher than or equal to a predetermined temperature;
a waste heat recovery flow passage through which the coolant is to flow to recover heat of the fuel cell by heat exchange with air;
a second heat exchanger disposed in the waste heat recovery flow passage to exchange heat between air-conditioning air and the coolant;
a second coolant circulator disposed in the waste heat recovery flow passage to circulate the coolant;
the first heat exchanger including an inlet coolant reservoir to reserve the coolant from the coolant circulation flow passage, a heat dissipator connected to the inlet coolant reservoir to dissipate heat of the coolant from the inlet coolant reservoir by heat exchange with air, and an outlet coolant reservoir connected to the heat dissipator to reserve the coolant from the heat dissipator;
the coolant circulation flow passage including a first coolant supply flow passage connected to the outlet coolant reservoir and an inlet port of the coolant flow passage to supply the coolant to the coolant flow passage, a first coolant exhaust flow passage connected to an outlet port of the coolant flow passage and the inlet coolant reservoir to discharge the coolant from the coolant flow passage to the inlet coolant reservoir, and a first bypass flow passage connected to the first coolant supply flow passage and the first coolant exhaust flow passage to bypass the first heat exchanger;

an upstream end of the waste heat recovery flow passage connected to at least one of the inlet coolant reservoir and the first coolant exhaust flow passage at a position downstream of a connection point between the first coolant exhaust flow passage and the first bypass flow passage; and a downstream end of the waste heat recovery flow passage connected to at least one of the inlet coolant reservoir, the outlet coolant reservoir, and the first coolant supply flow passage.

6. The waste heat recovery system according to claim 5, wherein the upstream end and the downstream end of the waste heat recovery flow passage are connected to the inlet coolant reservoir, and wherein a distance between a connection point between the first coolant exhaust flow passage and the inlet coolant reservoir and the upstream end is less than a distance between the upstream end and the downstream end.

7. The waste heat recovery system according to claim 5, wherein the first coolant circulator is disposed in the first coolant supply flow passage, and wherein the downstream end of the waste heat recovery flow passage is connected to the first coolant supply flow passage at a position upstream of the first coolant circulator.

8. The waste heat recovery system according to claim 5, wherein the waste heat recovery flow passage includes a second coolant supply flow passage that connects the second heat exchanger and the upstream end to supply the coolant to the second heat exchanger, a second coolant exhaust flow passage through which the coolant exhausted from the second heat exchanger is to flow toward the downstream end, a second bypass flow passage having one end connected to the second coolant supply flow passage and another end connected to the second coolant exhaust flow passage, and a second switching device that switches between a mode in which the coolant flowing out of the second coolant exhaust flow passage returns to the second heat exchanger via the second bypass flow passage and the second coolant supply flow passage and a mode in which the coolant flowing out of the second coolant exhaust flow passage flows towards the downstream end.

9. The waste heat recovery system according to claim 5, wherein the first switching device is disposed in the first coolant supply flow passage, and wherein the first bypass flow passage is connected to the first switching device.

\* \* \* \* \*